United States Patent [19]

Takekoshi

[11] 4,221,897
[45] Sep. 9, 1980

[54] METHOD FOR MAKING POLYETHERAMIDE ACID

[75] Inventor: Tohru Takekoshi, Scotia, N.Y.

[73] Assignee: General Electric Company, Schenectady, N.Y.

[21] Appl. No.: 37,435

[22] Filed: May 9, 1979

[51] Int. Cl.$^2$ ............................................. C08G 73/10
[52] U.S. Cl. .................... 528/125; 528/126; 528/128; 528/172; 528/179; 528/185; 528/207; 528/208
[58] Field of Search .............. 528/125, 126, 128, 179, 528/185, 172, 207, 208, 26

[56] References Cited

U.S. PATENT DOCUMENTS

| | | | |
|---|---|---|---|
| 3,528,937 | 9/1970 | Reynolds | 528/353 |
| 3,575,923 | 4/1971 | Jones | 528/353 |
| 3,847,867 | 11/1974 | Heath et al. | 528/185 |
| 3,905,942 | 9/1975 | Takekoshi et al. | 528/185 |
| 3,983,093 | 9/1976 | Williams et al. | 528/185 |
| 3,989,670 | 11/1976 | Takekoshi et al. | 528/208 |
| 4,048,142 | 9/1977 | Takeoshi | 528/208 |
| 4,073,773 | 2/1978 | Banucci et al. | 528/208 |
| 4,087,441 | 5/1978 | Lee | 260/326 N |
| 4,157,996 | 6/1979 | Boldebuck et al. | 528/185 |

OTHER PUBLICATIONS

Thermo-analytical Investigation of Transformation of Polyamido Acid into Polyimide, J. of Applied Poly. Sci., vol. 19, pp. 2335-2345 (1975), Sazanov et al.
Amine Salts of Polypyrromellitamic Acids, J. of Poly. Sci., Reynolds et al., pp. 45-56 (1968).

*Primary Examiner*—Lester L. Lee
*Attorney, Agent, or Firm*—William A. Teoli; James C. Davis, Jr.

[57] ABSTRACT

A method is provided for making polyetheramide acid having an intrinsic viscosity in N,N-dimethylacetamide of about 0.05 dl/g to 0.4 dl/g at 25° C. A mixture of aromatic bis(ether dicarboxylic acid) or dianhydride is heated with a substantially equal molar amount of organic diamine in the presence of water and in the substantial absence of an organic solvent. The resulting polyetheramide acid is recovered as a finely divided powder and can be used to make high molecular weight polyetherimide by melt extrusion.

7 Claims, No Drawings

METHOD FOR MAKING POLYETHERAMIDE ACID

CROSS REFERENCE TO RELATED APPLICATIONS

Reference is made to Banucci et al Ser. No. 788,248, filed Apr. 18, 1977, now U.S. Pat. No. 4,098,800, for Process for Preparing Polyetheramide Acids; my copending application Ser. No. 37,438, filed May 9, 1979 for Injection Moldable Polyetherimide Oligomers and Method for Making, filed concurrently herewith and copending application Ser. No. 37,437, filed May 9, 1979, Banucci et al, for Particulated Polyetherimide and Method for Making, filed concurrently herewith, where all of the aforementioned applications are assigned to the same assignee as the present invention.

BACKGROUND OF THE INVENTION

As shown by Banucci et al U.S. Pat. No. 4,098,800, assigned to the same assignee as the present invention, particulated oligomeric polyetheramide acids can be made by effecting reaction between (a) an aromatic bis(ether anhydride) or "organic dianhydride" of the formula,

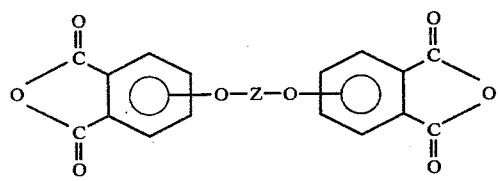
(1)

and (b) mixtures of one or more of said bis(ether anhydride)s with up to 30 mole percent benzophenone dianhydride of the formula,

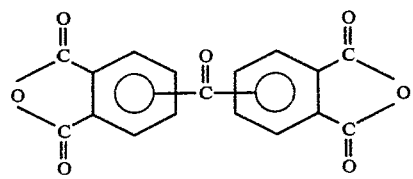
(2)

with at least one organic diamine of the general formula, (3) $H_2N-R-NH_2$, in an inert organic liquid selected from the group consisting of (c) chlorinated hydrocarbon selected from the group consisting of methylene chloride, chloroform, 1,2-dichloroethane, and mixtures thereof and (d) mixtures of said chlorinated hydrocarbon with up to 50% by weight of acetone to form oligomeric polyetheramide acid which is substantially insoluble in said liquid, where Z is a member selected from

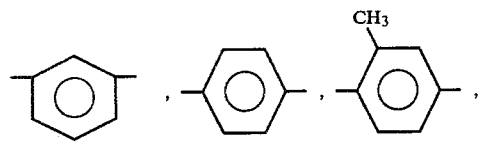

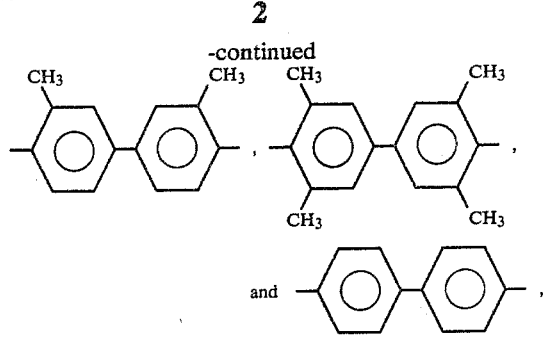

and divalent organic radicals of the general formula,

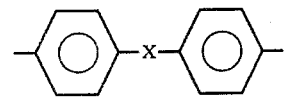

where X is a member selected from the class consisting of divalent radicals of the formulas,

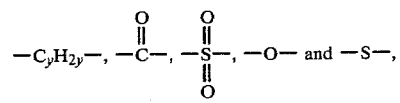

where y is an integer from 1 to 5, and R is a divalent organic radical selected from the class consisting of aromatic hydrocarbon radicals having from 6 to about 20 carbon atoms and halogenated derivatives thereof, alkylene radicals having from 2 to about 20 carbon atoms, cycloalkylene radicals having from 3 to about 20 carbon atoms, from $C_2$ to about $C_8$ alkylene terminated polydiorganosiloxane and divalent radicals of the general formula,

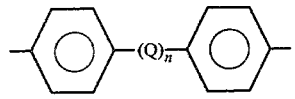

where Q is a member selected from the class consisting of —O—, —S—, and —$C_xH_{2x}$—, where x is an integer from 1 to 5 and n is 0 or 1.

It has been found that the above-described particulated polyetheramide acids of Banucci et al are useful in various coating applications, for example, applications to aluminum or copper wire using fluid bed electrostatic coating procedures. However, these electrostatically applied oligomeric powders often form films containing entrapped bubbles which reduces the utility of the resulting polyetherimide as an insulating coating.

In copending application Ser. No. 37,437, filed concurrently herewith, improved results were achieved when the particulated, substantially organic solvent-free polyetheramide acid of Banucci et al was heated in a non-oxidizing atmosphere for a time sufficient to effect at 70% imidization of the polyetheramide acid without substantially sintering the powder. A reduction in bubbling of films was achieved when the imidized powder was applied onto various substrates such as wire. However, the resulting films were often highly cross-linked, or the polyetheramide acid oligomers often had amine terminal groups rendering the prepolymers unsuitable for making high molecular weight thermoplastics which are moldable by standard injection molding techniques.

The present invention is based on the discovery that particulated substantially organic solvent-free polyetherimide oligomer, capable of being injection molded to the high molecular weight state, can be made by coreacting substantially equal molar amounts if aromatic bis(etheranhydride) of formula (1) and organic diamine of formula (3) in the presence of water and in the substantial absence of an organic solvent, as distinguished from my copending application Ser. No. 37,438. The surprising feature of the present invention is that the use of water in the absence of organic solvent to facilitate reaction between the aromatic bis(ether anhydride) and organic diamine reactants is that the stoichiometry of the reactants is substantially maintained in the resulting polyetheramide acid reaction product. As a result, the recovered polyetheramide acid can be readily converted to a high molecular weight, injection moldable plastic substantially free of cross-linking.

STATEMENT OF THE INVENTION

There is provided by the present invention, a method for making polyetheramide acid which comprises (A) heating a mixture which is substantially free of organic solvent and which comprises by weight 20% to 95% of water, and 5% to 80% of a substantially equal molar mixture of organic diamine of formula (3) and a bis(ether dicarbonyl) compound of the formula, $$Q^1-\ddot{O}-Z-O-Q^1, \quad (4)$$

where Z is as previously defined, and $Q^1$ is a member selected from

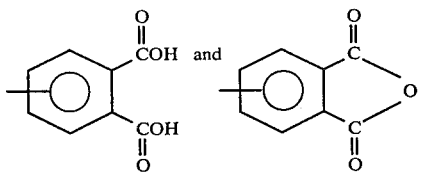

(B) recovering the polyetheramide acid from the mixture of (A).

Aromatic bis(ether anhydride)s of formula (1) include, for example:
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
4,4'-bis(3,4-dicarboxyphenoxy)benzophenone dianhydride;
4,4'-bis(3,4-dicarboxyphenoxy)diphenylsulfone dianhydride;
2,2-bis[4-(2,3-dicarboxyphenoxy)phenyl]propane dianhydride;
4,4'-bis(2,3-dicarboxyphenoxy)diphenyl ether dianhydride;
4,4'-bis(2,3-dicarboxyphenoxy)diphenyl sulfide dianhydride;
4,4'-bis(2,3-dicarboxyphenoxy)benzophenone dianhydride;
4,4'-bis(2,3-dciarboxyphenoxy)diphenyl sulfone dianhydride;
4-(2,3-dicarboxyphenoxy)-4'-(3,4-dicarboxyphenoxy)-diphenyl-2,2-propane dianhydride,
and mixtures thereof Aromatic bis(ether anhydride)s especially preferred herein are 2,2-bis[4-(3,4-dicarboxyphenoxy)phenyl]propane dianhydride, 2,2-bis[4-(2,3-dicarboxyphenoxy)phenyl]propane dianhydride; 4-(2,3-dicarboxyphenoxy)-4'-(3,4-dicarboxyphenoxy)-diphenyl-2,2-propane dianhydride; and mixtures thereof.

Some of the aromatic bis(ether anhydride)s of formula (1) are shown in U.S. Pat. No. 3,972,902 (Darrell Heath and Joseph Wirth). As described therein, the bis(ether anhydride)s can be prepared from the hydrolysis, followed by dehydration, of the reaction product of nitro-substituted phthalonitriles with a metal salt of a dihydric phenol compound in the presence of a dipolar aprotic solvent.

Additional aromatic bis(ether anhydride)s also included by formula (1) are shown by Koton, M. M. Florinski, F. S. Bessonov, M. I. Rudakov, A. P. (Institute of Heteroorganic Compounds), Academy of Science, (U.S.S.R.), U.S.S.R. No. 257,010, Nov. 11, 1969, Appl. May 3, 1967, and by M. M. Koton, F. S. Florinski, Zh. Org. Khin, 4 (5), 774 (1968).

The organic diamines of formula (3) include, for example:
o-phenylenediamine;
m-phenyelnediamine;
p-phenylenediamine;
4,4'-diaminodiphenylpropane;
4,4'-diaminodiphenylmethane (commonly named 4,4'-methylenedianiline);
4,4'-diaminodiphenyl sulfide (commonly named 4,4'-thiodianiline);
4,4'-diaminodiphenyl ether (commonly named 4,4'-oxydianiline);
1,5-diaminonaphthalene;
3,3'-dimethylbenzidine;
3,3'-dimethoxybenzidine;
2,4-bis(β-amino-t-butyl)toluene;
1,3-diamino-4-isopropylbenzene;
1,2-bis(3-aminopropoxy)ethane;
benzidine;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
bis(3-aminopropyl)tetramethyldisiloxane;
bis(4-aminobutyl)tetramethyldisiloxane, and mixtures of such diamines.

In the practice of the invention, oligomeric particulated polyetheramide acid, or "polyamide acid" consisting essentially of chemically combined units of the formula,

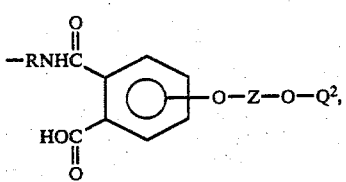

where Z and R are as previously defined, and $Q^2$ is a member selected from

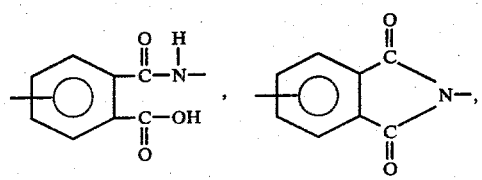

and mixtures thereof, can be made by effecting reaction between substantially equal molar amounts of aromatic bis(ether dicarbonyl) compound of formula (4), or "organic dianhydride" and organic diamine of formula (3). Reaction is effected in the presence of water at temperatures in the range of 30° C. to 250° C. either under atmospheric pressure or under autogenous pressure.

Reaction can be facilitated by agitating the ingredients with a stirrer, Vertical Helicone Mixer, etc. In some instances, however, reaction can be effected without agitation.

In order to provide useful polyetheramide acid, it is preferred to incorporate chain stopping units into the polyetheramide acid while it is initially made from the organic dianhydride and organic diamine. Alternatively, chain stopping units can be incorporated into the polyetheramide acid during its melt polymerization at temperatures in the range of 200° C. to 350° C. while it is being agitated, for example, in an extruder. Suitable chain stopping monomer which can be used, for example, are amines such as $R^1NH_2$, where $R^1$ is selected from $C_{(6-13)}$ aromatic organic radicals and $C_{(1-20)}$ alkyl radicals. Some preferred amines are, for example, aniline, toluidine, anisidine, octylamine, dodecylamine, etc. In addition to organic amine, organic anhydrides, such as phthalic, etc., also can be used. The chain stoppers can be employed at from 0.01 to 0.2 moles per mole of organic dianhydride or organic diamine.

In order that those skilled in the art will be better able to practice the invention, the following examples are given by way of illustration and not by way of limitation. All parts are by weight.

EXAMPLE 1

A mixture of 31.192 parts of 2,2-bis[4-(3,4-dicarboxyphenoxy)phenyl]propane and 6.061 parts of metaphenylene diamine and about 100 parts of water were stirred under an argon atmosphere and heated to reflux in a twin screw Vertical Helicone Mixer. An aqueous suspension formed immediately, and after a period of approximately 1.5 hours the oily phase solidified to form a yellow granular solid. The reaction was terminated at 2 hours of heating at reflux. The product was filtered and dried under vacuum. The yield was 32.2 parts or 91.4%. Based on method of preparation, the product was a polyetheramide acid imide having an intrinsic viscosity in dimethylacetamide of 0.11 dl/g.

The same procedure was repeated, except that the reaction was terminated after heating at reflux for 3 hours. The intrinsic viscosity of the polyetheramide acid imide was 0.17 dl/g in dimethylacetamide.

The above polyetheramide acid imide is fed into an extruder in accordance with the procedure shown in Takekoshi et al U.S. Pat. No. 4,011,198, resulting in the production of high strength polyetherimide.

EXAMPLE 2

A mixture of 0.5205 part of 2,2-bis[4-(3,4-dicarboxyphenoxy)phenyl]propane dianhydride and 0.1081 part of metaphenylenediamine and about 1 part of water were placed into a glass tube. The tube was sealed under vacuum and then heated at 210° C. for 2 hours. The tube was allowed to cool and the product was isolated by filtration. There was obtained a 97.3% yield of a particulated product having an intrinsic viscosity of 0.28 dl/g in chloroform. Based on method of preparation, the product was a polyetherimide.

The same reaction was repeated, except that in place of the dianhydride there was utilized 0.5505 part of the corresponding tetra-acid. There was obtained a 0.5798 part of a particulated product having an intrinsic viscosity of 0.25 dl/g in chloroform. These particulated products are melt extruded to high molecular weight polyetherimide in accordance with the procedure of Example 2.

EXAMPLE 3

There was placed in a glass lined autoclave, 208.15 parts of 2,2-bis[4-(3,4-dicarboxyphenoxy)phenyl]propane dianhydride, 43.25 parts of metaphenylenediamine and about 250 parts of water. The vessel was flushed with nitrogen and heated to 238° C. for a period of 1 hour. The reaction mixture was then stirred at 238° C. for an additional 2 hours and then allowed to cool. The water was removed by decantation and the product was dissolved in about 15,000 parts of methylene chloride. The methylene chloride solution was then poured into methanol and the product precipitated which was recovered by filtration. A quantitative yield of particulated product was obtained having an intrinsic viscosity of 0.36 dl/g in chloroform. Based on method of preparation, the product was a polyetherimide consisting essentially of chemically combined units of the formula,

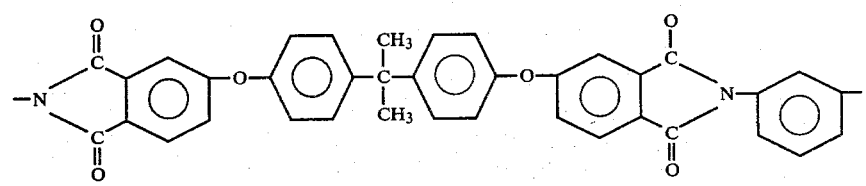

The above particulated polyetherimide is melt extruded in accordance with Example 1 to produce an injection moldable high performance thermoplastic.

EXAMPLE 4

A mixture of 22.26 parts of the tetra-acid of Example 2, 4.326 parts of metaphenylenediamine, about 1 part of a 1% aqueous solution of sodium dodecylbenzenesulfonate and about 50 parts of water was stirred and heated to reflux. A fine milky dispersion was formed. An oily phase began to separate in about 20 minutes which solidified in 1.5 hours. It was broken into fine granules. The reaction mixture was further stirred and refluxed for a total of 10 hours and filtered. There was obtained a 99.9% yield of a powdery product having an intrinsic viscosity of 0.13 dl/g in dimethylformamide. Based on method of preparation, the product was a polyetheramide acid imide having chemically combined units of the formula,

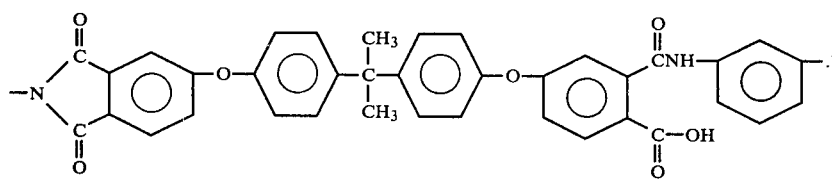

The above polyetheramide acid imide was heated at 260° C. for 3 hours under sealed conditions. There was obtained a polyetherimide having an intrinsic viscosity of 0.78 dl/g when the product was recovered.

EXAMPLE 5

Mixtures of equal molar amounts of organic dianhydride and organic diamine and water were placed in a stainless steel Vertical Helicone Mixer. The mixtures were stirred and heated to reflux for 4 hours. The products were separated by filtration and washed with water and dried. The following results were obtained, where "DMA" is dimethylacetamide, "I.V." is intrinsic viscosity, Tm is melting point, Tg is glass transition temperature and DSC is differential scanning calorimeter.

| Dianhydride | Diamine | Yield | DSC | I.V. |
|---|---|---|---|---|
| (dianhydride with -O-Ph-S-Ph-O- bridge) | $H_2N-\bigcirc-O-\bigcirc-NH_2$ | 95.7 | 156.6 Tg | 0.34 DMA |
| (benzene dianhydride) | $H_2N-\bigcirc-O-\bigcirc-NH_2$ | 95.0 | — | insol. |
| (bis-phthalic dianhydride linked by C) | $H_2N-(CH_2)_7-NH_2$ | 48.1 | 187 Tm | 0.06 DMA |
| (benzene dianhydride) | $H_2N-(CH_2)_9-NH_2$ | 99.9 | 220 Tg | insol. |

The above results show that the method of the present invention also can be used to make polyimides in addition to polyetherimides. It is found that the polyetherimide having chemically combined sulfur is a particulated material which can be converted to higher molecular weight polyetherimide in accordance with the procedure of Example 1. The polyimides made in accordance with the method of the present invention, as distinguished from polyetherimides are based on the reaction of organic dianhydrides of the formula,

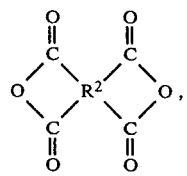

(5)

where $R^2$ is a $C_{(6-20)}$ tetravalent aromatic organic radical, for example,

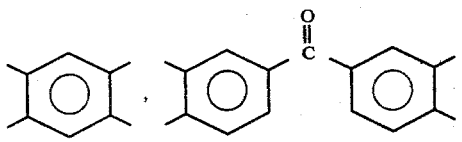

etc., with organic diamines of formula (3).

Although the above examples are directed to only a few of the very many variables of the method of the present invention, it should be understood that the present invention is directed to a much broader method involving the dicarbonyl compound of formula (4), the organic dianhydride of formula (5) and the organic diamine of formula (3).

What I claim as new and desire to secure by Letters Patent of the United States is:

1. A method for making polyetheramide acid imide or polyetherimide which comprises
    (A) heating a mixture at a temperature in the range of from 30° C. to 250° C. which is substantially free of organic solvent and which comprises by weight 20% to 95% of water, and 5% to 80% of a substantially equal molar mixture of organic diamine of the formula,

and a bis(ether dicarbonyl) compound of the formula,

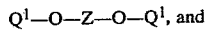

(B) recovering the polyetheramide acid imide or polyetherimide from the mixture of (A), where Z is a member selected from

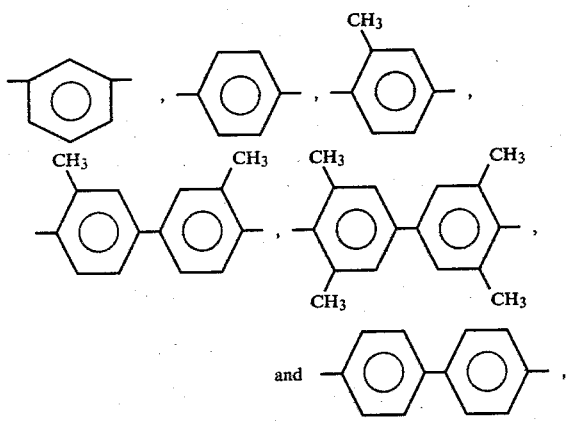

and divalent organic radicals of the general formula,

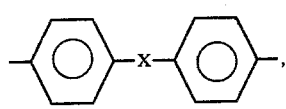

where X is a member selected from the class consisting of divalent radicals of the formulas,

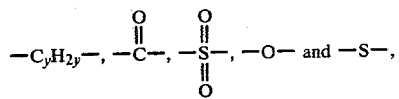

R is a divalent organic radical selected from the class consisting of aromatic hydrocarbon radicals having from 6 to 20 carbon atmos and halogenated derivatives thereof, alkylene radicals having from 2 to about 20 carbon atoms, cycloalkylene radicals having from 3 to 20 carbon atoms, from $C_2$ to about $C_8$ alkylene terminated polydiorganosiloxane and divalent radicals of the general formula,

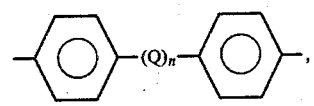

Q is a member selected from the class consisting of —O—, —S—, and —$C_xH_{2x}$—, $Q^1$ is a member selected from

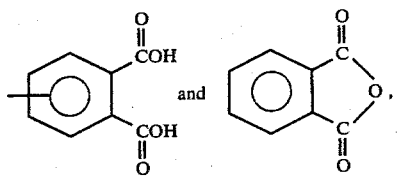

y is an integer from 1 to 5, x is an integer from 1 to 5 and n is 0 or 1.

2. A method in accordance with claim 1, where the dicarbonyl compound is 2,2-bis[4-(3,4-dicarboxyphenoxy)phenyl]-propane dianhydride.

3. A method in accordance with claim 1, where the dicarbonyl compound is 2,2-bis[4-(3,4-dicarboxyphenoxy)phenyl]propane.

4. A method in accordance with claim 1, where the organic diamine is meta-phenylene diamine.

5. A method for making polyimide which comprises,
    (C) heating a mixture which is substantially free of organic solvent and which comprises by weight 20% to 95% of water and 5% to 80% of a substantially equal molar mixture of organic diamine of the formula,

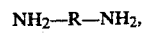

and an organic dianhydride of the formula,

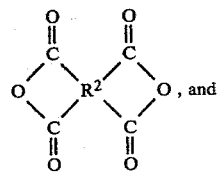

(D) recovering the polyimide from the mixture of (C), where $R^2$ is a $C_{(6-20)}$ tetravalent organic radical and R is a divalent organic radical selected from the class consisting of aromatic hydrocarbon radicals having from 6 to 20 carbon atoms and halogenated derivatives thereof, alkylene radicals having from 2 to about 20 carbon atoms, cycloalkylene radicals having from 3 to 20 carbon atoms, from $C_2$ to about $C_8$ alkylene terminated polydiorganosiloxane and divalent radicals of the general formula,

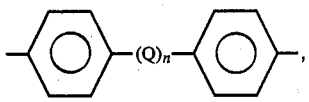

Q is a member selected from the class consisting of —O—, —S—, and —$C_xH_{2x}$—, y is an integer from 1 to 5, x is an integer from 1 to 5 and n is 0 or 1.

6. A method in accordance with claim 5, where $R^2$ is

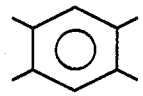

7. A method in accordance with claim 5, where $R^2$ is

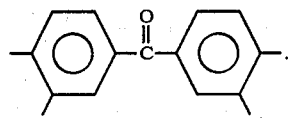

* * * * *